A. M. VAN DOORN.
METHOD OF MAKING THERMOPHONE ELEMENTS.
APPLICATION FILED JAN. 2, 1920.
1,394,454.
Patented Oct. 18, 1921.
3 SHEETS—SHEET 3.
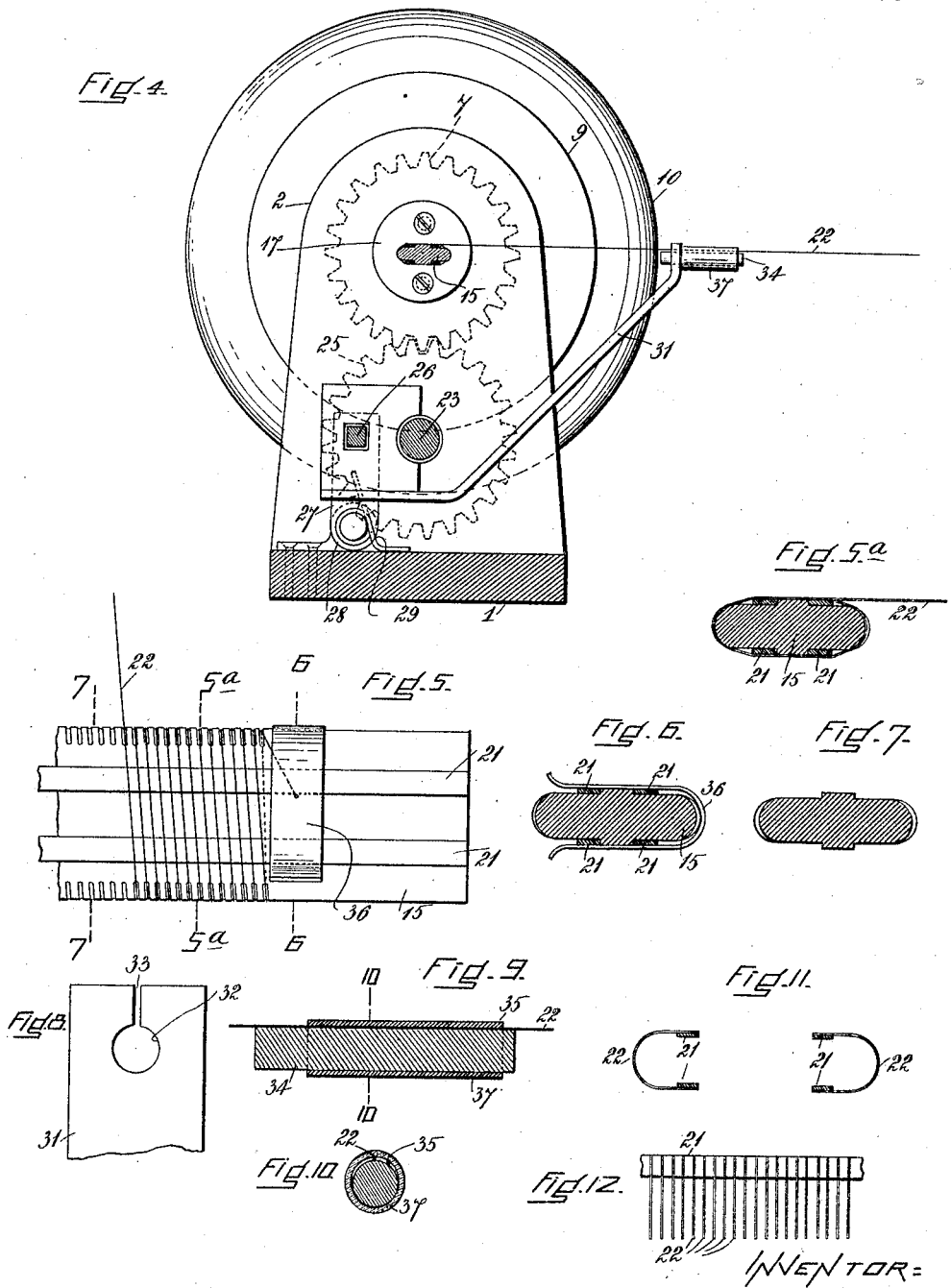

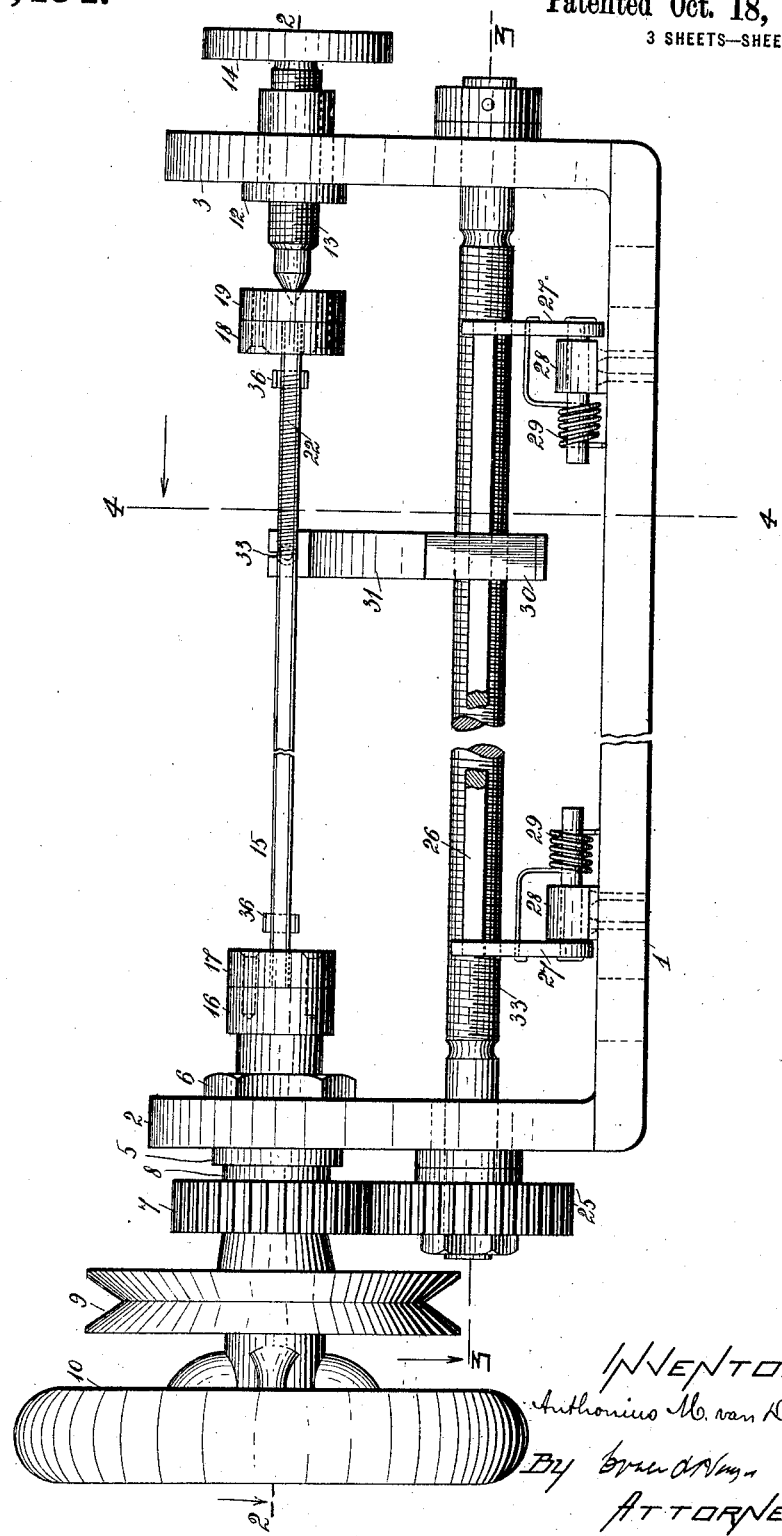

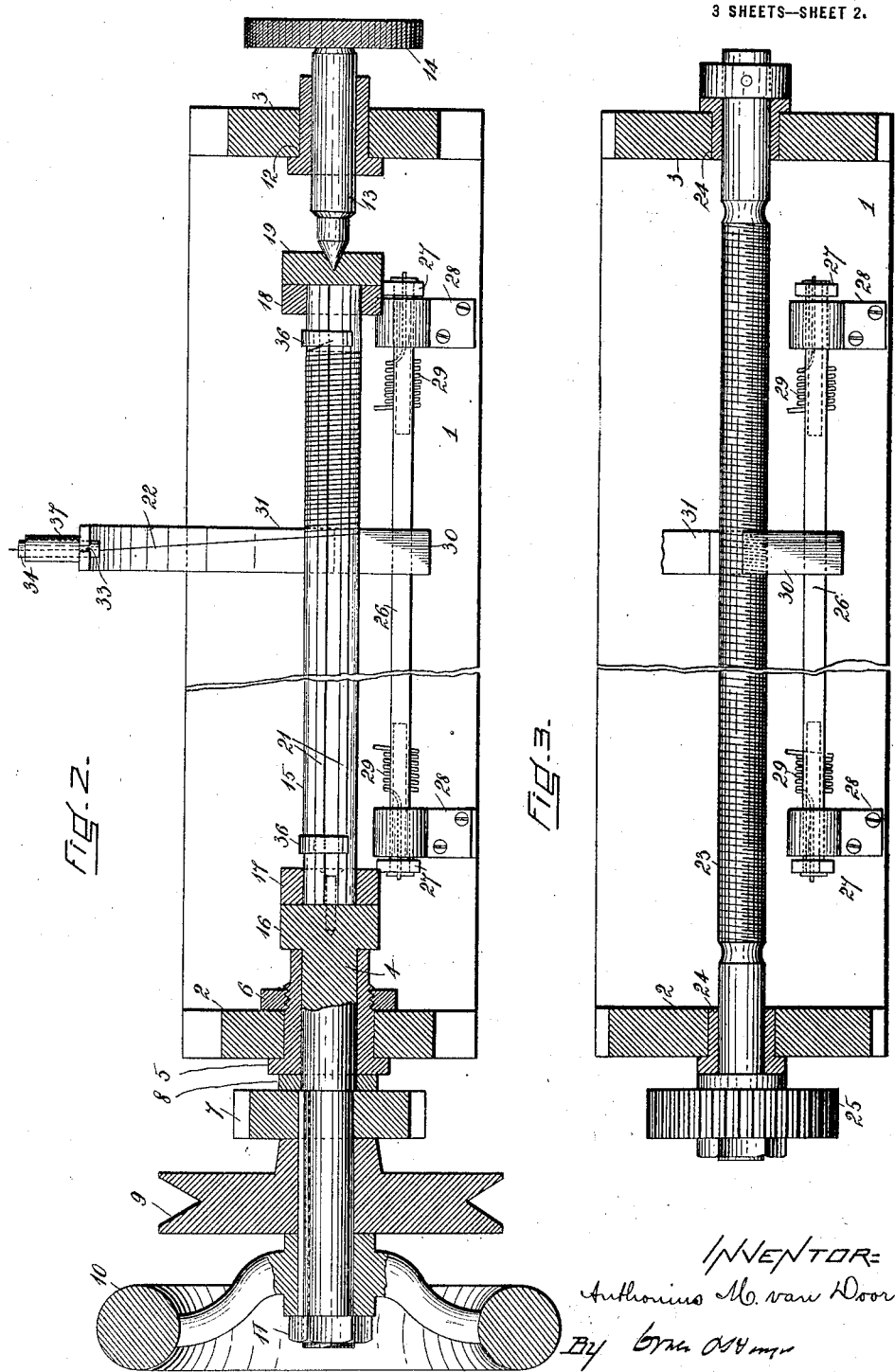

UNITED STATES PATENT OFFICE.

ANTHONIUS M. VAN DOORN, OF BOSTON, MASSACHUSETTS, ASSIGNOR TO AMERICAN THERMOPHONE COMPANY, OF BOSTON, MASSACHUSETTS, A CORPORATION OF MASSACHUSETTS.

METHOD OF MAKING THERMOPHONE ELEMENTS.

1,394,454.   Specification of Letters Patent.   Patented Oct. 18, 1921.

Application filed January 2, 1920. Serial No. 349,105.

*To all whom it may concern:*

Be it known that I, ANTHONIUS M. VAN DOORN, a subject of Wilhelmina, Queen of the Netherlands, residing in Boston, Massachusetts, have invented a new and useful Improved Method of Making Thermophone Elements, of which the following is a specification.

Thermophones are usually made of minute pieces of Wollaston wire attached to suitable supports which serve as terminals. Because of their size they are hard to manufacture and this invention relates to a method which I have found easy, simple and economical as a large number of elements may be made thereby at the same time.

In my companion application 349,106, filed Jan. 2, 1920, I have described and claimed a machine by which this method may be carried out although it may be otherwise performed, but for convenience I have herein described the same machine. It will be understood by reference to the drawings, in which—

Figure 1 is a side elevation of a machine embodying my invenion.

Fig. 2 is a plan thereof.

Fig. 3 is a section on line 3—3 of Fig. 1.

Fig. 4 is a section on line 4—4 of Fig. 1.

Fig. 5 is a detail showing a portion of the mandrel wound with wire.

Fig. 5ª is a section on line 5ª—5ª of Fig. 5.

Fig. 6 is a section on line 6—6 of Fig. 5.

Fig. 7 is a cross section of the mandrel alone.

Fig. 8 is an elevation of a portion of the wire delivery.

Fig. 9 is a section of the wire guide.

Fig. 10 is a cross section thereof.

Fig. 11 shows two thermophone elements in cross section, and

Fig. 12 is a side elevation of one of said elements.

In Figs. 5 to 12 the parts shown are very much enlarged.

As a whole the machine is similar to a lathe, having a base 1 on one end of which is mounted a headstock 2 and at the other end a tailstock 3. The head stock carries a shaft running in a flanged bushing 5 which is threaded at its outer end and is held in place by a nut 6. 7 is a gear keyed to the bushing, 8 being a washer between the gear 7 and the flange of the bushing 5. On the shaft is also keyed a power supply shown as a pulley 9, though power may be otherwise applied. The shaft also carries a handwheel 10 held thereon by the nut 11.

The tailstock 3 carries a bushing 12 threaded on its interior to receive a centering screw 13 which for convenience has a handwheel 14.

15 is a mandrel mounted to be rotated by the shaft 4 and between it and the centering screw. For this purpose a suitably shaped block 16 is attached to the end of the shaft 4 to rotate with it and to this block is screwed or otherwise attached a socket piece 17 in the socket of which (not shown) one end of the mandrel sets. The other end of the mandrel sets in a socket in a corresponding socket piece 18 which is attached to a center head 19. This center head has a conical recess to receive the end of the centering screw 13. In practice one end of the mandrel 15 is set into the socket piece 17 and the socket piece 18 is placed on the other end and the centering screw 13 is adjusted to set into the recess in the centering head 19, and so hold the mandrel that it may be revolved with the shaft 4.

The mandrel 15 is shaped in cross section as shown in Fig. 7, 20, 20 being recesses running the length of the mandrel to receive the metallic bars 21 over which the wire 22 is wound and to which it is ultimately attached.

The wire 22 is fed to the mandrel from a suitable reel (not shown) by the following means:—

23 is a screw in the head and tail stocks 2 and 3, the cylindrical ends of which are mounted in bearings 24, 24. Suitable bushings are provided in which the screw may be turned. At one end it carries a gear 25 which is in mesh with the gear 7 on the power shaft 4 so that the mandrel and the screw will be turned simultaneously. These relative movements may be changed by using gears of different sizes in a way well known. The pitch of the screw determines the lay of the wire on the mandrel.

26 is a rod, preferably square in cross section, mounted on arms 27. Each arm is mounted on a support 28 to turn thereon and each support carries a spring 29 one end of which engages the bar 1 and the other an arm 27 to throw it toward the screw. Slidable on the rod 26 is a nut, or as shown a half nut, 30, which engages the screw 23 and is held against it by the springs 29 and the rod 26. This construction is such that the rotation of the screw carries the travel of the nut from one end thereof to the other.

The nut 30 forms a traveling carriage for the wire 22 to guide it to the rotating mandrel. For this purpose there is mounted on the nut an arm 31 having at its upper end a threaded recess 32 which is slotted as at 33 to guide the wire to the mandrel. A short rod 34 screws into the recess 32. This rod has a slot 35 through which the wire 22 is led to the slot 33. I prefer to surround the rod 34 with an elastic sleeve 37 to keep the wire in the slot 35.

In practice four metallic bars 21 being set into the recesses 20, the mandrel being in place and the carriage having been threaded with the wire and being placed at one end, say the left end, of the machine, the end of the wire is drawn over onto the mandrel and is there held by a spring clip such as is shown at 36 in Fig. 6. This is merely a narrow strip bent into the shape shown in that figure. It will be seen from that figure that this clip serves also to hold the bars 21 in place on the mandrel for which purpose a clip is used at each end of the mandrel as shown in Figs. 1 and 2. Power is then applied to rotate the mandrel and the screw so that the wire is fed evenly and wound on the mandrel in a true spiral until the other end of the mandrel is reached where it is fastened by another clip like 36. By means of a minute quantity of solder the wire is soldered to all four bars 21. With a cutting instrument the blank so formed is cut from the mandrel to form blanks such as are shown in cross section in Fig. 11, the cut being made along both top and bottom of the mandrel between two bars 21. The bars may then be cut to form thermophone elements having any desired number of loops. The etching process to eliminate the metal coating of the core may take place at any time after the blanks have been taken from the mandrel.

The method consists therefore in applying to a mandrel which is preferably a flat oval in cross section, two bars of metal on the two opposing flat sides of the mandrel, the bars on the same side of the mandrel being called adjacent bars, and then winding spirally around said mandrel and bars and in contact with the bars a piece of Wollaston wire the spirals of which shall be equidistant along the entire length of the bars, then soldering the wire to the bars at every place of contact and cutting the wires by a sharp cutting instrument between the adjacent bars on the same flat side of the mandrel, so that as a result there will be produced two sets of blanks, each set comprising two bars which have been lying upon the two opposing flat sides of the mandrel during the process of construction, connected by wire loops which have been formed over curved surfaces of the mandrel.

It is evident that this method may be otherwise carried out, the use of a mandrel not being theoretically essential thereto, although eminently desirable as a simple way of supporting the bars and shaping the loops, its chief point of novelty lying in the fact that by the one process two blanks of any desired length may be made from four metal bars around which a single wire has been wound to form two sets of loops the ends of which join, the two blanks being then separated between the adjacent bars to separate the two sets of loops, and from them elements of any desired size or number of loops can be cut. In the continuation of the process the blanks as a whole or the separate elements may be dipped into acid in order that the outer coating of the Wollaston wire may be etched therefrom.

It is believed that the above process will be fully understood. It is also evident that the essence of this process lies in the wrapping of a Wollaston wire of any desired length around metal bars properly supported in such a way that loops are formed between two sets of bars and that the blanks may be made from such structure by cutting the wires between each pair of adjacent bars. It will be remembered that the Wollaston wire used is about 10 microns only in diameter.

What I claim as my invention is:—

That improvement in the art of making thermophone elements which consists in supporting two pairs of metal bars in opposition to each other, winding a length of Wollaston wire spirally about said metal bars so that such winding shall be equidistant apart and form loops between the bars, cutting the wire between adjacent bars so as to leave each set of loops with their ends attached to the bars, then etching the loops.

ANTHONIUS M. van DOORN.